(12) United States Patent
Seo

(10) Patent No.: US 7,550,196 B2
(45) Date of Patent: Jun. 23, 2009

(54) METHOD FOR MAKING FLEXIBLE AUTOMOBILE INTERIOR MATERIAL AND SHEET FOR THE CONSTRUCTION AND ITS PRODUCT MADE THEREFROM

(76) Inventor: Yeun Kwon Seo, 859-44, Anyang 2-dong, Manan-gu, Anyang-shi, Kyungki-do 430-840 (KR)

( * ) Notice: Subject to any disclaimer, the term of this patent is extended or adjusted under 35 U.S.C. 154(b) by 361 days.

(21) Appl. No.: 10/538,909

(22) PCT Filed: Dec. 17, 2003

(86) PCT No.: PCT/KR03/02756

§ 371 (c)(1),
(2), (4) Date: Jul. 10, 2005

(87) PCT Pub. No.: WO2004/056565

PCT Pub. Date: Jul. 8, 2004

(65) Prior Publication Data

US 2006/0135015 A1    Jun. 22, 2006

(30) Foreign Application Priority Data

Dec. 21, 2002 (KR) ...................... 10-2002-0082102
May 12, 2003 (KR) ...................... 10-2003-0029815

(51) Int. Cl.
*B32B 3/26* (2006.01)
*D04H 5/02* (2006.01)

(52) U.S. Cl. .............. 428/316.6; 428/306.6; 428/308.4; 428/309.9; 442/327; 442/370; 442/381; 442/387

(58) Field of Classification Search .............. 428/316.6, 428/306.6, 308.4, 309.9; 442/327, 370, 381, 442/387
See application file for complete search history.

(56) References Cited

U.S. PATENT DOCUMENTS 3,059,312 A * 10/1962 Jamieson ..................... 442/224
3,664,905 A * 5/1972 Schuster ..................... 428/113
4,357,386 A * 11/1982 Luciano et al. ............... 442/30

(Continued)

FOREIGN PATENT DOCUMENTS

KR              177877 Y        4/2000

(Continued)

*Primary Examiner*—Hai Vo
(74) *Attorney, Agent, or Firm*—K & L Gates LLP

(57) ABSTRACT

Disclosed is a method of producing an automobile interior material or construction sheet with excellent processability, and its product made therefrom. More particularly, a method comprises by carding short fibers wherein short fibers are mixed with polypropylene fibers and polyethylene fibers in a mixing ratio of 3 to 7:7 to 3, on one side or both sides of a foamed layer produced by foaming any one selected from the group consisting of polypropylene chips, polyethylene chips, polyurethane chips, and expanded polystyrene chips; setting the short fibers with a shape of a truss in the foamed layer by interlacing the short fibers through a needle punching process; and thermally forming the short fiber layer(s) on the foamed layer by heating the portions of the short fibers exposed on the outside the foamed layer to 120 to 250° C. and pressing thereby melting, cooling and hardening the fused portions of the short fibers.

3 Claims, 1 Drawing Sheet

U.S. PATENT DOCUMENTS 4,581,272 A  4/1986  Walters et al.
5,093,967 A * 3/1992  Frank ........................... 24/693
5,268,226 A * 12/1993  Sweeney ................. 428/312.4
5,614,285 A  3/1997  Gardill
5,679,432 A * 10/1997  Holmquest et al. ............ 428/71
5,994,245 A * 11/1999  Marier et al. ................ 442/373
7,022,405 B2 * 4/2006  Kaplo ..................... 428/316.6

FOREIGN PATENT DOCUMENTS

KR  2001068161  7/2001

* cited by examiner

METHOD FOR MAKING FLEXIBLE AUTOMOBILE INTERIOR MATERIAL AND SHEET FOR THE CONSTRUCTION AND ITS PRODUCT MADE THEREFROM

FIELD OF THE INVENTION

The present invention relates to a method of flexible automobile interior material and construction sheet. More particularly, to a method comprising of 1) carding short fibers mixed with polypropylene fibers and polyethylene fibers each other, on one side or both sides of a foamed layer produced by foaming any one selected from the group consisting of polypropylene chips, polyethylene chips, polyurethane chips, and expanded polystyrene chips; and 2) setting the short fibers by interlacing through a needle punching process so that the short fibers are set with a shape of a truss in the foamed layer.

BACKGROUND OF THE INVENTION

In accordance with recent trends of considering automobiles as necessities, demands for an improved interior, safety, and driving comfort are growing. To meet such demands, various kinds of interior materials or sheets are applied to a head liner, a door trim, a rear shelf, a trunk mat, a car mat, a floor material, a bonnet, a ceiling material, a construction interior material, and a soundproof material.

Recently, the interior materials have been used sheet made of a substance selected from the group consisting of papers, vinyl, knits, non-woven fabrics, felts, and a combination thereof. At this time, the interior materials function to decorate an inside of an automobile such that users are comfortable in the automobile, to keep a warmth in the automobile or to shield the inside of the automobile from heat, to insulate and absorb an exterior sound to prevent exterior sound from penetrating into the automobile, and to reduce an impact force.

Hence, the interior materials must have excellent heat insulating properties, soundproof and absorbing properties, and shock-absorbing properties as well as excellent appearance. Additionally, the interior materials must be light in weight so as to reduce a weight of the automobile, and must have excellent processability so as to be applied to a complicated internal structure of the automobile and so as to cope with the structure change in conformity to the change of a kind of the automobile.

One example of a conventional automobile interior material includes two different layers. In detail, two different layers consist of a layer in which a vinyl paper and a release paper are attached to both sides of a felt, and the other layer in which a sponge and a knit are attached to one side of a pasteboard.

In this regard, the felt absorbs and insulates the exterior sound, the release paper shields a side of the felt, which comes into contact with a ceiling, and the vinyl paper prevents a surface defect of a bottom side of the felt or the contamination of the bottom side of the felt. Additionally, the pasteboard provides resistance against the bending of the felt, and the knit attached to the sponge acting as a surface cushion is used as a finishing material giving an excellent appearance.

However, the conventional automobile interior material is disadvantageous in that one plank is produced using various materials, such as the release paper, felt, vinyl paper, pasteboard, sponge, and knit, thus a production process is long and production cost is undesirably increased. Another disadvantage of the conventional automobile interior material is that most of the materials constituting the automobile interior material cannot be recycled, thus resulting in environmental pollution.

Meanwhile, a sheet (carpet) is suggested so as to improve a soundproofing and insulating effect, in which the functional yarns are inserted into a hard non-woven fabric and then a soft non-woven fabric is laminated on the resulting structure. However, this sheet has very poor processability and thus shouldn't be used as an interior material of the automobile. As well, an improved sheet is developed, in which a polyethylene resin is coated on any one side of the sheet, but this is disadvantageous in that a surface of the sheet is contaminated or the functional yarns are agglomerated because the polyethylene resin leaks slowly from the sheet due to the heating and compression of the polyethylene resin during the processing.

Accordingly, there remains a need to develop a light automobile interior material, which can be recycled, and has improved processability, sound insulating property, soundproofing property, heat insulating property, and shock absorbing property.

Moreover, consumers want the light automobile interior material, which can absorb vibration or an impact, is not harmful to health, and has excellent appearance.

SUMMARY OF THE INVENTION

Accordingly, the present invention has been made keeping in mind the above problems occurring in the prior arts, it is an object of the present invention to provide a method of producing an automobile interior material or construction sheet with excellent processability.

It is another object of the present invention to provide an automobile interior material or construction sheet with excellent processability produced by method of present invention, and further provide an automobile or construction panel produced using the method.

And, it is a further object of the present invention to provide a method of producing an automobile interior material or a construction sheet, in which short fiber layers and fiber layers are completely attached to a foamed layer by heating, thereby forming a plate-shaped structure. In this regard, the automobile interior material or construction sheet is applied to a rear shelf, a door trim, a head liner, a trunk mat, a floor material, a ceiling material, and a bonnet liner, and is not easily bent but has excellent processability, heat insulating properties, soundproofing properties, and sound absorbing properties, thus being applied to a cushion for a bed or construction materials.

Additional features and advantages of the present invention are described in, and will be apparent from, the following Detailed Description of the Preferred Embodiments and the figures.

BRIEF DESCRIPTION OF THE DRAWING

The above and other aspects, features and other advantages of the present invention will be more clearly understood from the following detailed description taken in conjunction with the accompanying drawing, in which.

Figure 1:
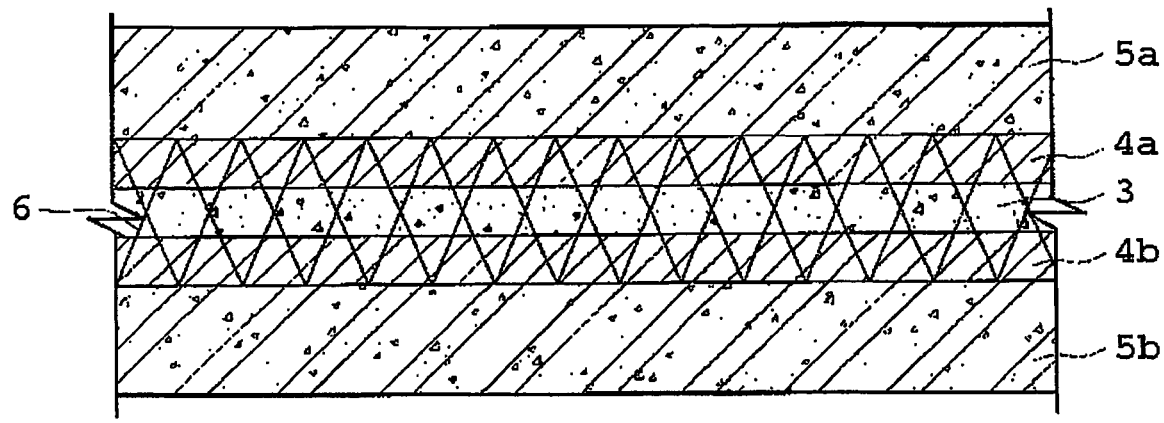
FIG. 1 is a sectional view of an automobile interior material or a construction sheet with excellent processability according to the present invention.

| 3: | Foamed layer | 4a, 4b: | Short fiber layer |
|---|---|---|---|
| 5a, 5b: | Fiber layer | 6: | Short fiber |

DETAILED DESCRIPTION OF THE INVENTION

In order to achieve the above objects of the present invention, the preferably first embodiment of a method comprises the steps of 1) carding short fibers wherein short fibers are mixed with polypropylene fibers and polyethylene fibers in a mixing ratio of 3 to 7:7 to 3, on one side or both sides of a foamed layer produced by foaming any one selected from the group consisting of polypropylene chips, polyethylene chips, polyurethane chips, and expanded polystyrene chips; 2) setting the short fibers with a shape of a truss in the foamed layer by interlacing the short fibers through a needle punching process; and 3) forming the short fiber layer(s) by thermally setting the portions of the short fibers exposed on the outside the foamed layer to 120 to 250° C. and pressing thereby melting, cooling and hardening the fused portions of the short fibers.

Additionally, the preferably second embodiment of a method comprises the steps of 1) carding short fibers wherein short fibers are mixed with polypropylene fibers and polyethylene fibers in a mixing ratio of 3 to 7:7 to 3, on one side or both sides of a foamed layer produced by foaming any one selected from the group consisting of polypropylene chips, polyethylene chips, polyurethane chips, and expanded polystyrene chips; 2) setting the short fibers with a shape of a truss in the foamed layer by interlacing the short fibers through a needle punching process; 3) putting a fiber layer on the formed layer by secondarily carding fibers including the polypropylene or polyethylene fiber, and natural fiber mixed with each other in a mixing ratio of 3 to 7:7 to 3, on both sides exposed outside the foamed layer; and 4) forming the fiber layers and simultaneously the short fiber layer(s) by thermally setting the portions of the fibers layers exposed outside the foamed layer to 120 to 250° C. and pressing thereby melting, cooling and hardening the fused portions of the fibers layers.

Therefore, a hard plate-shaped the automobile interior material or construction sheet is manufactured by the second embodiment of a method.

In order to achieve the above objects of the present invention, the preferably third embodiment of a method comprises the steps of 1) carding short fibers wherein short fibers are mixed with polypropylene fibers and polyethylene fibers each other on one side or both sides of a foamed layer produced by foaming any one selected from the group consisting of polypropylene chips, polyethylene chips, polyurethane chips, and expanded polystyrene chips; and 2) forming the short fiber layer(s) by thermally setting the portions of the short fibers on one side or both sides of the foamed layer to 120 to 250° C. and pressing thereby melting, cooling and hardening the fused portions of the short fiber layer protruded from the foamed layer while pressing the portions of the short fibers to melt the portions of the short fibers.

Furthermore, the objects of the present invention are achieved by providing the preferably forth method comprises the steps of 1) carding short fibers wherein short fibers are mixed with polypropylene or polyethylene fiber, and natural fiber on one side or both sides of a foamed layer produced by foaming any one selected from the group consisting of polypropylene chips, polyethylene chips, polyurethane chips, and expanded polystyrene chips; 2) setting the short fibers with a shape of a truss in the foamed layer by interlacing the short fibers through a needle punching process; and 3) forming the short fiber layer(s) by thermally setting the portions of the short fibers on the outside the foamed layer to 120 to 250° C. and pressing thereby melting, cooling and hardening the fused portions of the short fibers.

In this respect, it is preferable that the short fibers include uninflammable or general polypropylene fibers and polyethylene fibers mixed with each other in a mixing ratio of 3 to 7:7 to 3.

As well, it is preferable that the polyethylene fiber comprises 20 to 40% by weight of low melting point polyethylene component.

Moreover, it is preferable that the fiber layers comprise polypropylene or polyethylene fiber, and natural fiber mixed with each other in a mixing ratio of 3 to 7:7 to 3. In this regard, the natural fiber is fiber produced from a fibroid material of a plant selected from the group consisting of linen, jute, great water rush, abaca, coconut, sisal, and arrowroot.

Meanwhile, the automobile interior material or construction sheet with excellent processability is produced through the methods of the present invention.

Furthermore, the present invention provides an automobile or construction panel, which is produced that uninflammable or general fabrics are fused on or attached to one side or both sides of the automobile interior material or construction sheet produced by the methods of the present invention.

The automobile or construction panel is also produced that any one material selected from the group consisting of plasters, cements, and ceramic pigments, is coated on both sides of the automobile interior material or construction sheet in a predetermined thickness, dried using hot air, and then heat-pressed.

With reference to FIG. 1, there is illustrated an automobile interior material or a construction sheet with excellent processability according to the preferable second embodiment of method of the present invention. The automobile interior material or construction sheet comprises a foamed layer 3 produced by foaming any one selected from the group consisting of polypropylene chips, polyethylene chips, polyurethane chips, and expanded polystyrene chips; short fiber layers 4a, 4b laminated on both sides of the foamed layer 3; and fiber layers 5a, 5b layered on the short fiber layers 4a, 4b. At this time, each the fiber layers 5a or 5b comprises a component mixed with polypropylene fibers or polyethylene fibers, and natural fiber.

According to the present invention, the short fiber layers 4a, 4b can be used in polypropylene fibers and polyethylene fibers mixed with each other in a predetermined mixing ratio. More preferable, the polyethylene fibers may contain a component having 20 to 40% by weight of low melting point polyethylene which is molten at 70 to 150° C. Accordingly, when the automobile interior material or construction sheet is heated to 120 to 250° C. and pressed, a composition of each layer, which is the short fiber layers 4a, 4b laminated on both sides of the foamed layer 3 in accordance with a carding process, or short fibers 6 embedded in the foamed layer 3 in accordance with a needle punching process, is same as polyethylene fibers preferably polyethylene fibers having low melting point, thereby being simultaneously molten and forming a hard plate-shaped structure. At this time, the low melting point fibers means fibers having a lower melting point than general fibers by 10 to 30° C.

Particularly, the natural fiber produced from a fibroid material of a plant selected from the group consisting of linen, jute, great water rush, abaca, coconut, sisal, and arrowroot is mixed with the polypropylene fibers to form the plate-shaped fiber layers 5a, 5b.

In detail, the polypropylene fibers are mixed with the natural fiber in a mixing ratio of 3 to 7:7 to 3 to produce the fiber layers 5a, 5b, and the polypropylene fibers are mixed with the polyethylene fibers in a mixing ratio of 3 to 7:7 to 3 to produce the short fiber layers 4a, 4b. Particularly, it is preferable that the polyethylene fibers contain 20 to 40% by weight of low melting point polyethylene component which is molten at 70 to 150° C.

Therefore, in accordance with the method of present invention, hard plate-shaped the automobile interior material or construction sheet can be obtained by two types. One is that the short fiber layers are firstly formed on the foamed layer 3 using a carding device according to the carding process and then the short fibers are interlaced with each other according to the needle punching process so that the short fibers are embedded in a truss shape in the foamed layer 3, finally the short fiber(s) is(are) formed by heating to 120 to 250° C., and pressed.

Alternatively, the short fiber layers 4a, 4b are firstly formed on the foamed layer 3 using a carding device according to the carding process and then the short fibers are interlaced with each other according to the needle punching process so that the short fibers are embedded in a truss shape in the foamed layer 3, sequentially the fiber layers 5a, 5b produced by mixing the polypropylene fibers with the natural fiber selected from the group consisting of linen, jute, great water rush, abaca, coconut, sisal, and arrowroot in a predetermined mixing ratio are layered on the short fiber layers 4a, 4b, and the resulting structure is then heated to 120 to 250° C. and pressed. The polyethylene fibers (low melting point polyethylene fibers) embedded in the foamed layer 3 are molten and then cooled, leading the attachment of the fiber layers 5a, 5b to both sides of the short fiber layers 4a, 4b. Furthermore, the hard plate-shaped structure including the foamed layer 3, short fiber layers 4a, 4b, and fiber layers 5a, 5b is formed due to the cooling of the molten polyethylene containing the each layer.

A better understanding of the present invention may be obtained by reading the following examples which are set forth to illustrate, but are not to be construed to limit the present invention.

EXAMPLE 1

An automobile interior material or a construction sheet having a foamed layer and short fiber layers was produced as the following procedure. Short fibers were subjected to a carding process on any one side or both sides of the foamed layer using a traditional carding device. At this time, the short fibers comprise polypropylene fibers and polyethylene fibers containing 30% by weight of low melting point polyethylene mixed with each other in a mixing ratio of 5:5. Wherein, the foamed layer was produced by foaming any one selected from the group consisting of polypropylene chips, polyethylene chips, polyurethane chips, and expanded polystyrene chips.

The short fibers putted on the foamed layer in a predetermined thickness were interlaced with each other using a needle punching process, therefore the short fibers are embedded in a truss shape in the foamed layer. Whether the short fibers are putted on one side or both sides of the foamed layer using a carding process, it can be carried out one side needle punching process or both sides needle punching process.

Therefore, portions of the short fibers on outside the foamed layer was heated to 190° C. and pressed to be molten and then hardened to form the short fiber layers on the foamed layer, thereby producing the hard plate-shaped automobile interior material or construction sheet with excellent processability.

EXAMPLE 2

An automobile interior material or a construction sheet having a foamed layer, short fiber layers, and fiber layers were produced as the following procedure. Short fibers were subjected to a carding process on any one side or both sides of the foamed layer using a traditional carding device. At this time, the short fibers comprised polypropylene fibers, and polyethylene fibers containing 30% by weight of low melting point polyethylene component mixed with each other in a mixing ratio of 5:5. Wherein, the foamed layer was produced by foaming any one selected from the group consisting of polypropylene chips, polyethylene chips, polyurethane chips, and expanded polystyrene chips.

The short fibers putted on the foamed layer in a predetermined thickness were interlaced with each other using a needle punching process, therefore the short fibers are embedded in a truss shape in the foamed layer. Whether the short fibers are putted on one side or both sides of the foamed layer using a carding process, it can be carried out one side needle punching process or both sides needle punching process. Thereafter polypropylene fibers or polyethylene fibers, and natural fiber mixed with each other in a mixing ratio of 5:5 were subjected to the carding process on the portions of the short fibers exposed outside the foamed layer to form the fiber layers are formed on both sides of the foamed layer. In this respect, the natural fiber was selected from the group consisting of linen, jute, great water rush, abaca, coconut, sisal, and arrowroot.

Additionally, the fiber layers were heated to 210° C. and pressed to melt a portions of the short fibers exposed on one side or both sides the foamed layer and then harden it to form the short fiber layers and simultaneously to attach between the foamed layer and the fiber layers, thereby producing the hard plate-shaped automobile interior material or construction sheet with excellent processability.

In this respect, because heat applied to the fiber layers was set higher than heat applied to the short fibers according to example 1 by 10 to 20° C., heat was transferred through the fiber layers to the short fibers even though the short fibers were not directly heated, thereby the short fibers were sufficiently molten.

According to the present invention, uninflammable or general fabrics was further attached to one side or both sides of the automobile interior material or construction sheet produced through examples 1 and 2, thereby producing an automobile or construction panel.

Alternately, the automobile or construction panel was produced that any one material selected from the group consisting of plasters, cements, and ceramic pigments, was coated on both sides of the automobile interior material or construction sheet produced through examples 1 and 2 in a predetermined thickness, dried using hot air, and then heat-pressed.

INDUSTRIAL APPLICABILITY

As apparent from the above description, the present invention is advantageous in producing a hard and highly elastic automobile interior materials or a construction sheet with excellent processability without disadvantages of bending and low strength. The reason that short fibers including polypropylene fibers and polyethylene fibers mixed with each other are subjected to a carding process on one side or both sides of a foamed layer produced by foaming any one selected from the group consisting of polypropylene chips, polyethylene chips, polyurethane chips, and expanded polystyrene chips, and then the short fibers are interlaced with each other in the foamed layer through a needle punching process so that the short fibers are embedded in the foamed layer.

Other advantages of the present invention are that short fiber layers and fiber layers are entirely attached to the foamed layer by heating to form a plate-shaped structure, thus the automobile interior material or construction sheet of the present invention is applied to a rear shelf, a door trim, a head liner, a trunk mat, a floor material, a ceiling material, and a bonnet liner, and is not easily bent but has excellent processability, heat insulating properties, sound insulating properties, and sound absorbing properties, thereby being applied to a cushion for a bed or construction materials.

Furthermore, the foam and short fibers are made of the same material, and examples of the material of the foam and short fibers include polypropylene, polyethylene, and polyurethane. Thus, when the short fibers are fused on the foam, the complete adhesion between the foam and short fibers is accomplished.

As well, in the present invention, the short fiber layers are layered on one side or both sides of the foam layer, or the short fiber layers and fiber layers are sequentially layered on one side or both sides of the foam layer. Thereafter, uninflammable or general fabrics are further attached to both sides of the resulting structure, or any one selected from the group consisting of plasters, cements, and ceramic pigments is coated on both sides of such structure in a predetermined thickness, thereby producing an automobile or construction panel.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An automobile interior material or construction sheet comprising:
   a foamed layer produced by foaming and fusing together chips, said chips selected from the group consisting of polypropylene chips, polyethylene chips, polyurethane chips, and expanded polystyrene chips;
   a short fiber layer produced by carding and setting short fibers including polypropylene fibers and polyethylene fibers in a mixing ratio of 3 to 7:7 to 3, on one side or both sides of the foamed layer; and
   layers formed on both sides of the automobile interior material or construction sheet by coating at least one material comprising plasters in a predetermined thickness, drying using hot air, and then pressing the material while heating to form an automobile or construction panel,
   wherein, the short fibers are interlaced with each other in the foamed layer through a needle punching process so that the short fibers are embedded in a shape of a truss in the foamed layer, and the short fiber layer is set by heating to 120 to 250° C. while the portions of the short fibers are pressed to melt the portions of the short fibers exposed outside the foamed layer and then harden the molten portions of the short fibers to form the short fiber layers on the foamed layer.

2. An automobile interior material or construction sheet comprising:
   a foamed layer produced by foaming and fusing together chips, said chips selected from the group consisting of polypropylene chips, polyethylene chips, polyurethane chips, and expanded polystyrene chips;
   a short fiber layer produced by carding and setting short fibers including polypropylene fibers and polyethylene fibers mixed with each other at a ratio of 3 to 7:7 to 3, on one side or both sides of the foamed layer;
   a fiber layer produced by secondarily carding fibers including polypropylene or polyethylene fibers, and natural fiber mixed with each other in mixing ratio of 3 to 7:7 to 3, and layered on both exposed sides of the foamed layers; and
   layers formed on both sides of the automobile interior material or construction sheet by coating at least one material comprising plasters in a predetermined thickness, drying using hot air, and then pressing the material while heating to form an automobile or construction panel,
   wherein, the short fibers are interlaced with each other in the foamed layer through a needle punching process so that the short fibers are embedded in a shape of a truss in the foamed layer, and the fiber layers are set by heating to 120 to 250° C. while the fiber layers are pressed to melt the portions of the short fibers exposed on outside the foamed layer and then harden the molten portions of the short fibers to form the short fiber layers on the foamed layer and simultaneously attaching entirely the fiber layer to the foamed layer.

3. An automobile interior material or construction sheet with excellent processability comprising:
   a foamed layer produced by foaming and fusing together chips, said chips selected from any one of the group consisting of polypropylene chips, polyethylene chips, polyurethane chips, and expanded polystyrene chips;
   a short fiber layer produced by carding and setting short fibers and natural fibers mixed with each other, on one side or both sides of the foamed layer, wherein the foamed layer and short fibers each are made from the same resin material; and
   layers formed on both sides of the automobile interior material or construction sheet by coating at least one material comprising plasters, in a predetermined thickness, drying using hot air, and then pressing the material while heating to form an automobile or construction panel,
   wherein, the short fibers are interlaced with each other in the foamed layer through a needle punching process so that the short fibers are embedded in a shape of a truss in the foamed layer, and the short fiber layer is set by heating to 120 to 250° C. while the portions of the short fibers are pressed to melt the portions of the short fibers exposed outside the foamed layer and then harden the molten portions of the short fibers to form the short fiber layers on the foamed layer.

* * * * *